(12) United States Patent (10) Patent No.: US 9,308,850 B2
Johnson (45) Date of Patent: Apr. 12, 2016

(54) MOBILE SHOWROOM AND METHODS OF USE

(71) Applicant: Jamey Johnson, Naperville, IL (US)

(72) Inventor: Jamey Johnson, Naperville, IL (US)

(*) Notice: Subject to any disclaimer, the term of this patent is extended or adjusted under 35 U.S.C. 154(b) by 0 days.

(21) Appl. No.: 14/167,476

(22) Filed: Jan. 29, 2014

(65) Prior Publication Data

US 2014/0217765 A1 Aug. 7, 2014

Related U.S. Application Data

(60) Provisional application No. 61/757,946, filed on Jan. 29, 2013.

(51) Int. Cl.
*B60P 3/025* (2006.01)

(52) U.S. Cl.
CPC .................................. *B60P 3/0255* (2013.01)

(58) Field of Classification Search
CPC ...... B60R 13/00; B60P 3/0257; B60P 3/0255
USPC .......................................................... 296/24.36
See application file for complete search history.

(56) References Cited

U.S. PATENT DOCUMENTS

| | | | |
|---|---|---|---|
| 6,182,795 B1* | 2/2001 | Boerer | 186/52 |
| 6,585,305 B2* | 7/2003 | Nazginov et al. | 296/21 |
| 2001/0032152 A1* | 10/2001 | Khosla et al. | 705/27 |
| 2006/0059840 A1* | 3/2006 | Taylor | 52/633 |

* cited by examiner

*Primary Examiner* — Glenn Dayoan
*Assistant Examiner* — Melissa A Black
(74) *Attorney, Agent, or Firm* — Hartman Global IP Law; Gary M. Hartman; Michael D. Winter

(57) ABSTRACT

A mobile showroom and method of using a showroom to transport and display merchandise in an environment that nearly replicates that of the environment in which the merchandise will be used, and also allow the merchandise to be placed in the environment in which the merchandise will be used.

10 Claims, 5 Drawing Sheets

MOBILE SHOWROOM AND METHODS OF USE

CROSS REFERENCE TO RELATED APPLICATIONS

This application claims the benefit of U.S. Provisional Application No. 61/757,946, filed Jan. 29, 2013, the contents of which are incorporated herein by reference.

BACKGROUND OF THE INVENTION

The present invention generally relates to mobile showrooms for selling of merchandise.

Mobile showrooms are utilized for the selling of various goods. Existing mobile showrooms are generally effective only for those consumers that are physically capable of visiting the mobile showroom. Therefore, a population of the general public is generally precluded from utilizing the mobile showroom. In addition, mobile showrooms may sell goods that would best be viewed in the environment in which the goods will be installed and used, such as a home or office, or at least more nearly replicate the environment in which the goods will be installed and used.

Accordingly, there is a need for a mobile showroom which facilitates the selection of goods by a consumer regardless of whether the consumer can physically travel to the mobile showroom and which is easily accessible to all consumers. In addition, there is a need for a mobile showroom which allows consumers to have access to goods in a manner that allows the consumer to view the goods in the environment of their intended use or in an environment that nearly replicates the environment of their intended use.

BRIEF DESCRIPTION OF THE INVENTION

The present invention provides a mobile showroom and methods of using such a showroom to transport and display merchandise in an environment that nearly replicates that of the environment in which the merchandise will be used, and also allow the merchandise or electronic images thereof to be transported or transmitted to the environment in which the merchandise will be used.

According to one aspect of the invention, the mobile showroom comprises an interior compartment containing multiple units each comprising multiple goods mounted thereto. At least some of the multiple units are adapted to enable orientations thereof to be altered, and at least some of the multiple units are adapted to be releasably secured to frames within the compartment to allow removal of one or more of the multiple units and simultaneously the multiple goods mounted thereto. The showroom further comprises multiple lighting units that are individually operable and provide multiple different lighting effects including an overhead ambient lighting effect, a non-vertical directionally-focused flood and/or spot lighting effect directed at the multiple units, and a downwardly-directed flood and/or spot lighting effect that is more localized than the overhead ambient lighting effect. The showroom also comprises means for electronically communicating images of the multiple units and the multiple goods thereof outside the showroom.

According to another aspect of the invention, a method of using the showroom includes transporting the showroom with a vehicle to a location, operating the multiple lighting units to replicate a lighting environment within a building, and viewing of at least one of the multiple units of the showroom by a potential buyer of the multiple goods.

A technical effect of the invention is the ability of the showroom to facilitate the selection of goods by a consumer regardless of whether the consumer can physically travel to the showroom, and the ability of the showroom to allow consumers to have access to goods in a manner that allows viewing of the goods in the environment of their intended use or in an environment that nearly replicates the environment of their intended use.

Other aspects and advantages of this invention will be better appreciated from the following detailed description.

DETAILED DESCRIPTION OF THE INVENTION

Figure 1:
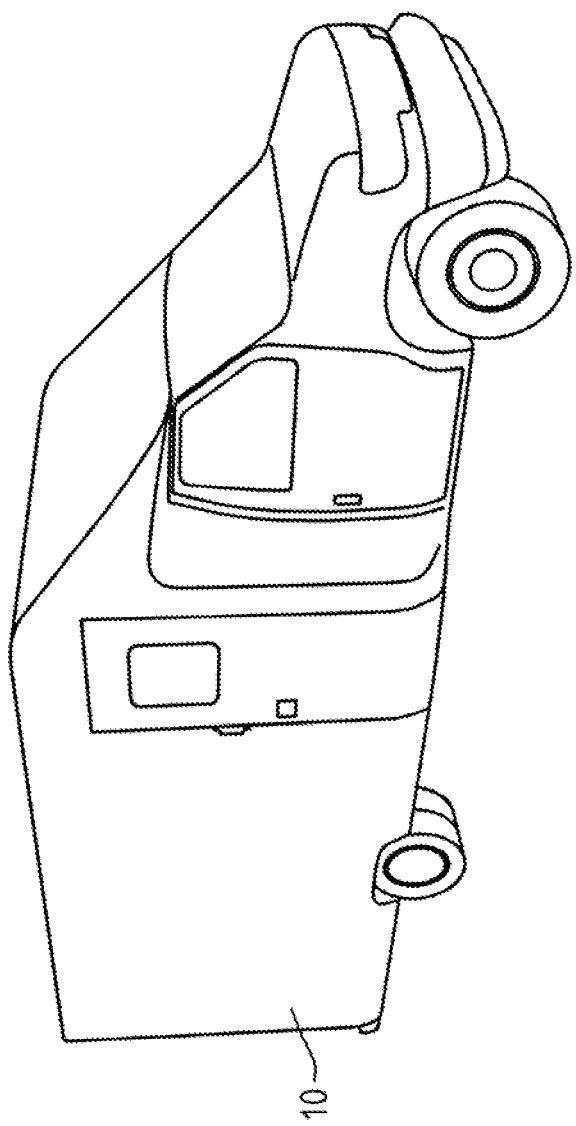
FIG. 1 is a perspective view of a vehicle of a type that can be implemented with the present invention.
Figure 2:
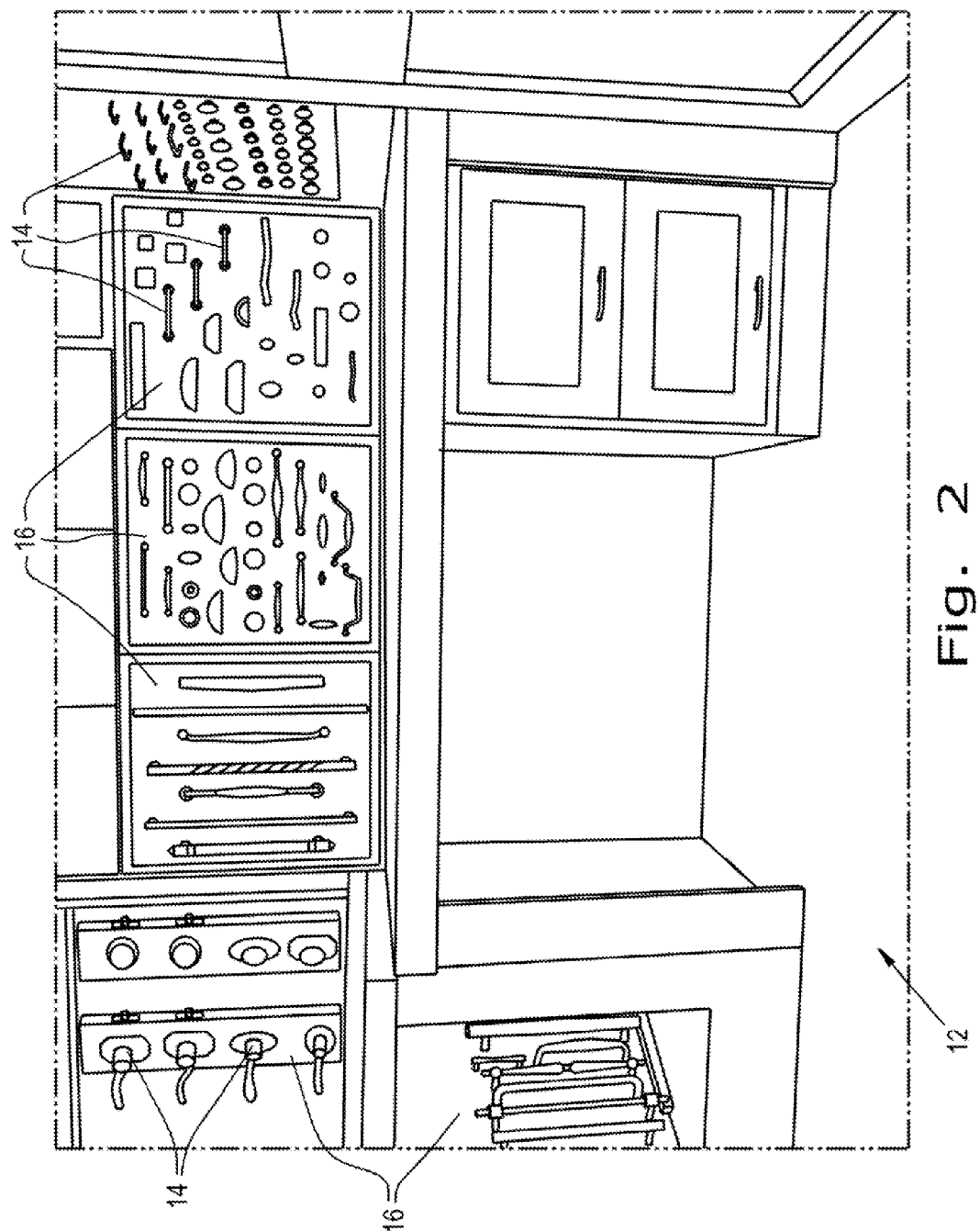
FIGS. 2, 3 and 4 are different views of the interior of a showroom within the vehicle of FIG. 1.
Figure 3:
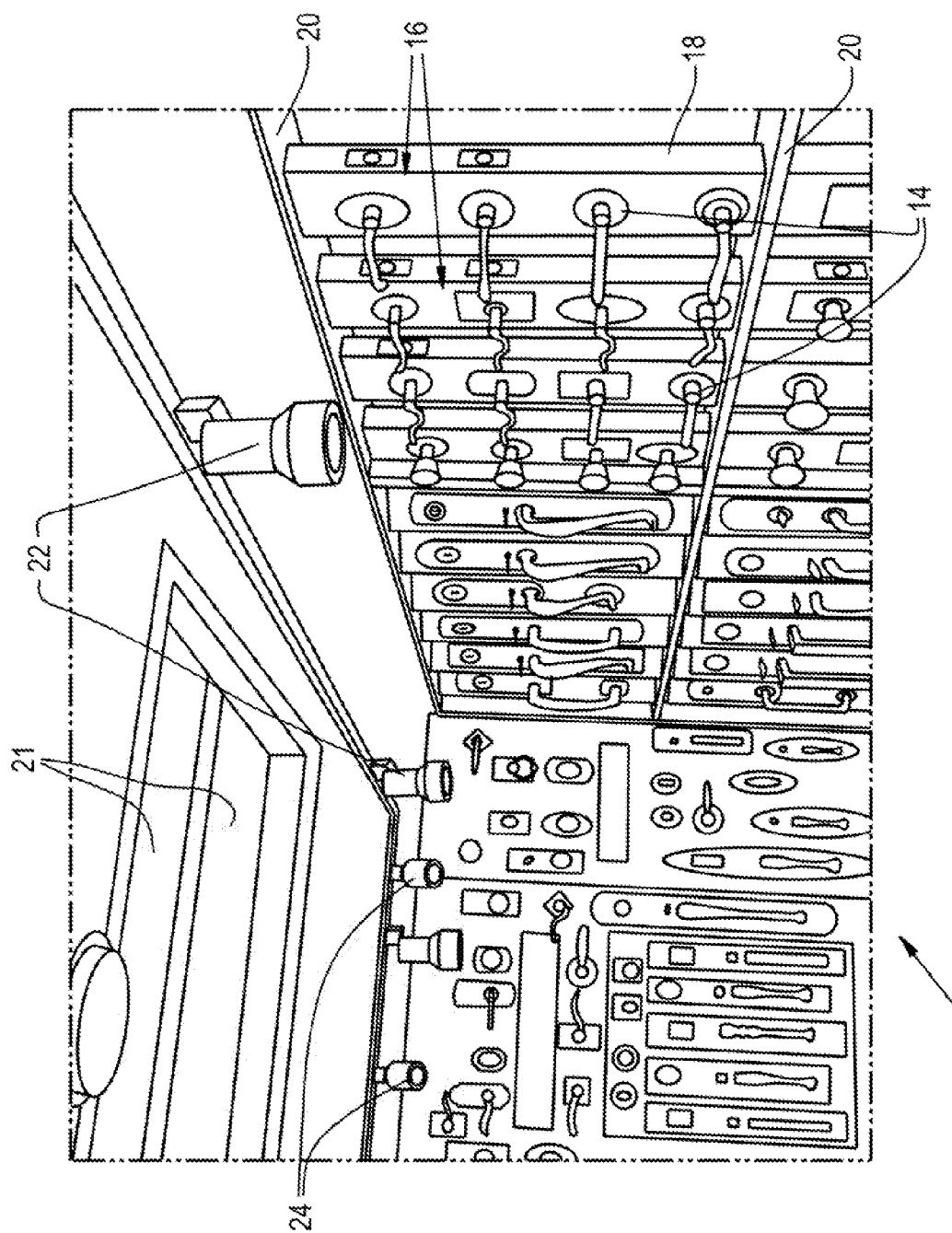
Figure 4:
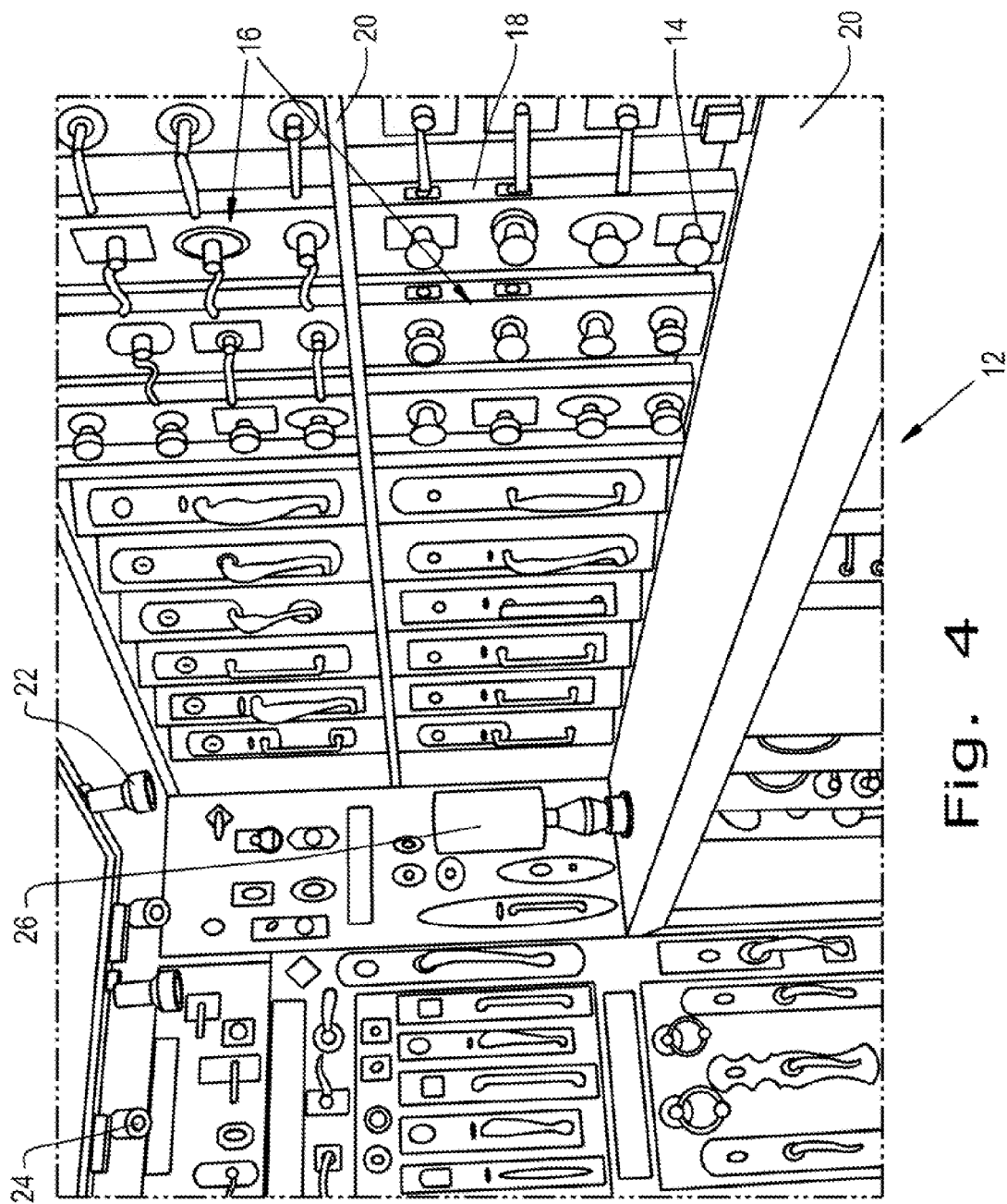

FIGS. 1 through 4 depict a vehicle 10 and three views of a showroom 12 within the vehicle 10. The vehicle 10 and showroom 12 represented in the Figures are adapted for selling consumer merchandise, and particularly hardware of the type installed and used on doors, cabinets, etc., of buildings such as houses, offices, etc. Specific but nonlimiting examples include hardware for entry doors, bathroom and kitchen cabinet doors, and the like. However, it should be understood that other types of goods could be easily sold through the use of the vehicle 10 and showroom 12, and as such, in addition to specific references to hardware and particular types thereof, the term "goods" may be used herein to more broadly encompass other types of merchandise.

As will be discussed in more detail below, the showroom 12 is adapted to display goods 14 within an interior compartment of the vehicle 10 sized to accommodate multiple individuals and allow such individuals to view the goods 14 under ambient conditions that better replicate the conditions that the goods 14 would have within the intended environment in which the goods 14 will be installed and used. In this regard, a potential buyer of the goods 14 can obtain a better appreciation for the appearance of the goods 14 as they will appear in their intended environment.

As will be also discussed below, the vehicle 10 and showroom 12 is adapted for use in combination with an electronic inventory of the goods 14 to allow predetermined selections of the goods 14 to be removed from the vehicle 10 and placed within the actual environment in which the goods 14 are intended to be installed and used. In this regard, a potential buyer of the goods 14 does not need to enter the showroom 12 and instead goods 14 that the buyer wishes to see can be physically brought directly into the intended environment for viewing by the buyer, or images of the goods 14 can be electronically transmitted to the buyer while located within the intended environment. This capability facilitates the selection process for individuals that might find it difficult to enter the showroom 12, for example, physically disabled and elderly individuals.

The vehicle 10 is represented as a modified truck or van, though other mobile configurations are possible. The showroom 12 preferably encompasses the majority of the vehicle 12 and can be accessed through a doorway, which can be adapted to be handicap-accessible. The showroom 12 contains multiple display units 16, each adapted to display a predetermined group of goods 14 that may be related in some manner, for example, by type, style, color, etc. Each unit 16 is preferably adjustable to allow the orientation thereof to be altered, for example, pivoted, rotated, etc. Each unit 16 is also preferably removable with the use of hardware that allow the entire unit 16 and its group of goods 14 to be quickly and easily removed from the vehicle 10. As nonlimiting examples, certain units 16 are shown as being configured as beams or columns 18 oriented vertically and adapted for rotation about upper and lower posts that extend from opposite ends of an individual column 18 and are releasably secured to frames 20 above and below the unit 16, for example, by being quickly engaged and disengaged with appropriate recesses provided in the frames 20. As such, "releasably secured" is used herein to refer to a switch, lever, or other type of hardware capable of being operated by hand to secure and release a unit 16 without the use of handtools. As a result, a potential buyer can optionally choose to examine the goods 14 while within the showroom 12 and/or after removal from the showroom 12 and placement of the goods 14 adjacent a door, etc., on which the goods 14 might be installed.

The showroom 12 is shown as including at least one skylight 21 for optionally providing true natural lighting during daylight hours. The showroom 12 is also preferably equipped within multi-display artificial lighting comprising a variety of artificial lighting units chosen, arranged and adjusted to allow a potential buyer to view the goods 14 under lighting conditions comparable to the environment in which the goods 14 are intended to be installed. For this purpose, the showroom 12 is preferably equipped with at least three different types of artificial lighting units 22, 24 and 26. A first type of lighting unit 22 is intended to provide overhead ambient lighting for general illumination. For this purpose, the lighting units 22 are represented as comprising multiple recessed light fixtures mounted from the ceiling of the showroom 12 to provide a downwardly-directed "flood" and/or "spot" lighting effect. A second type of lighting unit 24 is intended to provide lighting for architectural details, and for this purpose is represented as lighting fixtures mounted in the ceiling (and/or optional the walls and/or floor) of the showroom 12 to provide a non-vertical directionally-focused "flood" and/or "spot" lighting effect directed at the units 16. A third type of lighting unit 26 is intended to provide focused lighting for work spaces and dining. For this purpose, the lighting units 26 are represented as comprising a table lamp, though other types of fixtures (hanging lights, chandeliers, etc.) could be mounted to provide a more localized (for example, predominantly upward and/or downward) lighting effect than the lighting units 22. The artificial lighting units 22, 24 and 26 can be individually turned off and on to enable the lighting effect within the showroom 12 to be tailored to allow viewing of the goods 14 under ambient conditions that can better replicate the conditions that the goods 14 would have within the intended environment in which the goods 14 will be installed and used.

As noted above, the showroom 12 is also preferably equipped with an electronic capability to electronically communicate electronic images of the goods 14 within the showroom 12 to a potential buyer located outside of the showroom 12, for example, within the building in which the goods 14 are intended to be installed. The buyer can choose particular goods 14 or an entire unit 16 of interest from the inventory displayed within the showroom 12, request an electronic image of the chosen goods 14 or unit 16, for example, wirelessly transmitted to the screen of a mobile electronic device, and then place the electronic device at the point of installation within the building to enable the buyer to better visualize how the goods 14 would appear if installed. The electronic image can be obtained in real time, i.e., with a video device pointed at the goods 14, or can be stored on a nonvolatile memory storage device that can be accessed through the vehicle 10 or its operators.

Figure 5:
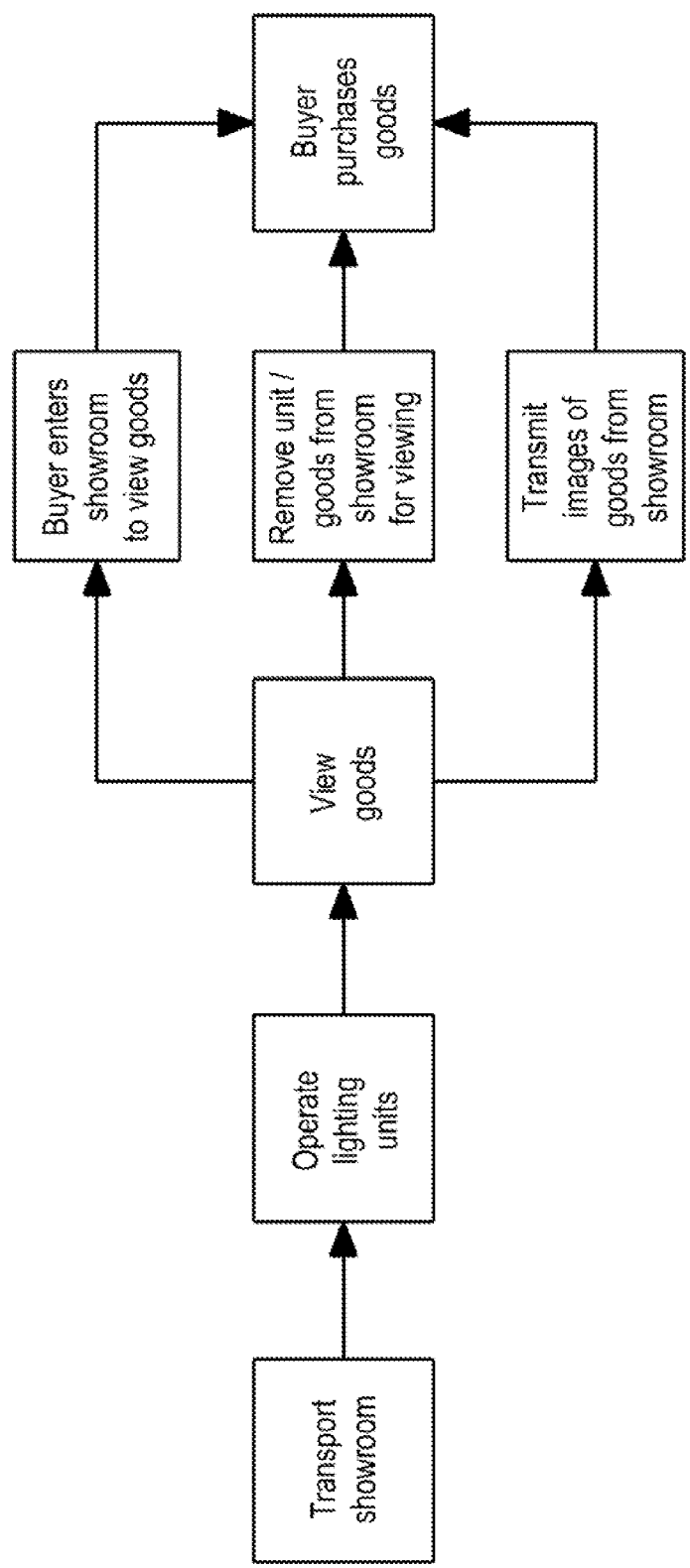
FIG. 5 represents a flowchart representing alternative methods of using the showroom of FIGS. 2, 3 and 4.

From the above it should be appreciated that the showroom 12 can be transported with the vehicle 10 to a location, not limited to the vicinity of a building in which the goods 14 are desired to be installed. The multiple lighting units 22, 24 and 26 can be selectively and individually operated to replicate a particular lighting environment within a building where the goods 14 are intended to be installed, so that the units 16 and their mounted goods 14 can be viewed by a potential buyer within the showroom 12. Optionally or in addition, one or more units 16 and their goods 14 mounted thereto can be removed from the showroom 12 and transported to a potential buyer, for example, located inside the building in which the goods 14 are intended to be installed. Still further or alternatively, images of the goods 14 can be electronically communicated to the potential buyer. Such alternatives are represented by the flowchart of FIG. 5.

In view of the above, it can be seen that significant advantages are associated with the mobile showroom 12. For example, a consumer is able to view the goods 14 regardless of weather conditions, disabilities, time constraints, under-construction impediments, and/or the like, without leaving the safety and comfort of a building in which the goods 14 are under consideration for installation. The electronic inventory imaging capability allows for the selected goods 14 to be juxtaposed at the point of installation within the building, thereby allowing the consumer to easily compare and contrast the selected goods 14. Alternatively or in addition, the consumer can see and touch the actual goods 14 within the showroom 12 or alternatively, the goods 14 can be easily retrieved from the showroom 12 to the building. As such, the showroom 12 is cable of a more efficient selection process by a consumer, resulting in fewer returns and potentially more satisfied consumers.

While the invention has been described in terms of a particular embodiment, it is apparent that other forms could be adopted by one skilled in the art. For example, the goods may vary, the mobile showroom may be customized in various manners, the electronic inventory imagery may be customized for particular consumers, and the overall mobile showroom may differ in appearance and construction from that shown in the Figures. In addition, the functions of certain components could be performed by components of different construction but capable of a similar function. Accordingly, it should be understood that the invention is not limited to the specific embodiments illustrated in the Figures. It should also be understood that the phraseology and terminology employed above are for the purpose of disclosing the illustrated embodiments, and do not necessarily serve as limitations to the scope of the invention. Therefore, the scope of the invention is to be limited only by the following claims.

The invention claimed is:

1. A mobile showroom comprising:
    an interior compartment containing multiple units each comprising multiple goods mounted thereto, the multiple goods being hardware of the type to be installed in a building, each of the multiple goods being displayed in a same manner as to how the hardware is intended to be installed in the building, at least some of the multiple units being adapted to enable orientations thereof to be altered, and at least some of the multiple units being adapted to be releasably secured to frames within the compartment to allow removal of one or more of the multiple units and simultaneously the multiple goods mounted thereto such that the multiple units that are releasably secured to the frames with the multiple goods mounted thereto may be transported and located within the building in which the multiple goods are intended to be installed;

multiple lighting units that are individually operable and provide multiple different lighting effects including an overhead ambient lighting effect, a non-vertical directionally-focused flood and/or spot lighting effect directed at the multiple units, and a downwardly-directed flood and/or spot lighting effect that is more localized than the overhead ambient lighting effect; and means for electronically communicating images of the multiple units and the multiple goods thereof outside the showroom.

2. The mobile showroom according to claim 1, wherein the orientations of at least some of the multiple units are alterable by pivoting or rotating.

3. The showroom according to claim 1, wherein the multiple goods comprise hardware chosen from the group consisting of handles for entry doors, handles for bathroom cabinet doors, and handles for kitchen cabinet doors.

4. A method of using the showroom of claim 1, the method comprising:

transporting the showroom with a vehicle to a location;

operating the multiple lighting units to replicate a lighting environment at a point of installation within the building where the multiple goods are intended to be installed; and viewing of at least one of the multiple units of the showroom by a potential buyer of the multiple goods.

5. The method according to claim 4, wherein the viewing step comprises the potential buyer entering the showroom to view the multiple goods therein.

6. The method according to claim 5, further comprising selectively operating the multiple lighting units to provide only one of the multiple different lighting effects within the showroom.

7. The method according to claim 4, wherein the viewing step comprises removing from the showroom at least a first of the multiple units and the multiple goods mounted thereon, and then transporting the first multiple unit to the potential buyer located inside the building.

8. The method according to claim 4, wherein the viewing step comprises operating the electronic communicating means to transmit the images of the multiple units and the multiple goods thereof to the potential buyer located outside the showroom.

9. The method according to claim 8, wherein the viewing step comprises operating the electronic communicating means to wirelessly transmit the images to a screen of a mobile electronic device located at the point of installation within the building.

10. The mobile showroom according to claim 1, wherein the electronic communicating means includes means for wirelessly transmitting the images to a screen of a mobile electronic device located at a point of installation within the building.

* * * * *